US008656569B2

(12) United States Patent
Klann

(10) Patent No.: US 8,656,569 B2
(45) Date of Patent: Feb. 25, 2014

(54) DEVICE FOR THE ASSEMBLY OF A MOTOR VEHICLE CLUTCH

(75) Inventor: Horst Klann, Villingen-Schwenningen (DE)

(73) Assignee: Klann Spezial-Werkzeugbau GmbH, Donaueschingen (DE)

( * ) Notice: Subject to any disclaimer, the term of this patent is extended or adjusted under 35 U.S.C. 154(b) by 1985 days.

(21) Appl. No.: 11/225,611

(22) Filed: Sep. 13, 2005

(65) Prior Publication Data

US 2006/0053611 A1 Mar. 16, 2006

(30) Foreign Application Priority Data

Sep. 14, 2004 (DE) ..................... 20 2004 014 423 U

(51) Int. Cl.
*B23P 19/04* (2006.01)

(52) U.S. Cl.
USPC .................................. 29/263; 29/255; 29/270

(58) Field of Classification Search
USPC ............ 29/279, 271–273, 258–269, 225–227
See application file for complete search history.

(56) References Cited

U.S. PATENT DOCUMENTS 1,123,513 A * 1/1915 Gaillard .......................... 29/261
2,310,639 A * 2/1943 Johnson, Jr. .................... 29/262
4,744,119 A * 5/1988 Omori ............................. 470/24
5,002,168 A * 3/1991 Hrubesch ................... 192/70.27
5,400,628 A * 3/1995 Ryan ............................... 70/417

FOREIGN PATENT DOCUMENTS

| | | | |
|---|---|---|---|
| DE | 299 15 947 | U1 | 1/2000 |
| FR | 2 666 760 | A1 | 3/1992 |
| GB | 2 216 612 | A | 10/1989 |
| JP | 01177979 | A | 7/1989 |

* cited by examiner

*Primary Examiner* — Lee D Wilson
(74) *Attorney, Agent, or Firm* — McGlew and Tuttle, P.C.

(57) ABSTRACT

A device for the assembly of a motor vehicle clutch (99), has a pretensioning device (1) for clamping a plate spring (102), which is arranged in a clutch cover (100) of the motor vehicle clutch (99) together with a pressure plate (104) and by which the pressure plate (104) is pressed against a carrier plate (119) of the clutch (99) during operation. The clutch cover (100) is mounted stationarily during operation by a plurality of mounting bolts on a driven plate (97) and wherein the pretensioning device (1) has a base plate (2) with a central pressing screw (6), which is axially adjustable centrally through the base plate (2) against the plate spring (102) for pretensioning the plate spring (102). To securely and concentrically attach the pretensioning device (1), centering bolts (3, 4, 5) are provided, which can be replaced with individual mounting bolts of the clutch cover (100) and which can be screwed stationarily into the mounting threads (90) of the driven plate (97) through the mounting holes (101) of the clutch cover (100). The centering bolts (3, 4, 5) engage adjusting slots (13, 14, 15) of the base plate (2). The slots extend radially in relation to the pressing screw (6), wherein the base plate (2) can be fixed to the centering bolts (3, 4, 5) in the axial direction via tightening nuts (16, 17, 18).

9 Claims, 5 Drawing Sheets

DEVICE FOR THE ASSEMBLY OF A MOTOR VEHICLE CLUTCH

CROSS REFERENCE TO RELATED APPLICATIONS

This application claims the benefit of priority under 35 U.S.C. §119 of German Application DE 20 2004 014 423.9 filed Sep. 14, 2004, the entire contents of which are incorporated herein by reference.

FIELD OF THE INVENTION

The present invention pertains to a device for the assembly of a motor vehicle clutch, comprising a pretensioning means for clamping a plate spring, which is arranged in a clutch cover of the motor vehicle clutch together with a pressure plate and by which the pressure plate is pressed against a carrier plate of the clutch during operation, wherein the clutch cover is mounted stationarily during operation on a driven plate by means of a plurality of mounting bolts, and wherein the pretensioning means has a base plate with a central pressing screw, which can be axially adjusted centrally through the base plate against the plate spring for pretensioning the plate spring, and which is provided with a central through hole, in which a centering tool can be arranged for the centered preassembly of the carrier plate.

BACKGROUND OF THE INVENTION

A device for the assembly of a motor vehicle clutch is already known, for example, from DE 299 15 947, which is provided with a pretensioning means. This pretensioning means has a base plate, which can be fastened to the clutch cover of the clutch. For fastening, three hook elements or draw hooks are provided on the base plate, which are mounted displaceably in longitudinal slots. These longitudinal slots are arranged in the base plate approximately in a triangular pattern and end a short distance in front of a through thread arranged centrally in the pressure plate. A pressing screw, which has a thrust collar toward the motor vehicle clutch in the assembled state, is screwed into this thread. The pressing screw is used, together with its thrust collar in the assembled state, i.e., in the state in which it is hung into the clutch cover with its draw hook, to pretension the plate spring arranged in the clutch cover. During normal operation, this plate spring is used to press the pressure plate, which is arranged in the clutch cover adjustably in relation thereto, against a carrier plate in order to bring about the torque closure of the clutch.

Such motor vehicle clutches are mounted stationarily on a driven plate during operation with their clutch cover, so that the carrier plate is clamped between the pressure plate and an annular friction lining of the driven plate by the pretensioning force of the plate spring when the clutch is not actuated. To make it possible to align the carrier plate concentrically with the pressure plate and consequently with the driven plate during assembly, it is proposed in the prior-art device that the pressing screw be provided with a central through hole, in which a centering tool can be arranged for the centered preassembly of the carrier plate on the pressure plate. The carrier plate can be attached to this centering tool, which passes through the through hole, and it can be fixed stationarily on the centering tool by a clamping device. When the carrier plate is attached to the centering tool, the clutch is pretensioned by means of the pretensioning means. The pretensioning means is now attached to the driven plate together with the clutch cover, the pressure plate arranged in the clutch cover together with the plate spring, as well as the carrier plate held on the pressure plate via the centering tool. The centering tool has a centering pin, which axially projects over the carrier plate and with which the centering tool can be placed concentrically, together with the complete clutch, on the driven plate arranged concentrically with the bearing bore of the crankshaft.

To actuate the pretensioning means, a transversely extending actuating lever, which transversely projects over the pressing screw on both sides, is arranged at the outer end of the central pressing screw. After the clutch has been attached to the driven plate and the clutch cover has been screwed to the driven plate by means of the mounting bolts, the pretensioning means is again released, so that the carrier plate is held clampingly in its desired centered position between the pressure plate and the driven plate. The gear can then be mounted and inserted with its gear shaft into the central clutch teeth of the centered carrier plate without problems.

To mount the carrier plate in a centered manner, the clamping device of the centering tool is designed as a centering cone, whose diameter or radial outside dimensions can be changed, so that it can be expanded and is held clampingly in the clutch teeth of the carrier plate. The carrier disk, which is held clampingly at the centering cone, can now be pulled against the pressure plate by a tension bolt, which is arranged on a corresponding draw spindle.

The drawback of this construction is that the clutch cover is to be aligned concentrically via its draw hook at the pretensioning means before the plate spring is pretensioned by the pressing screw. However, since the draw hooks are arranged in adjusting slots and have a considerable clearance in both the circumferential direction and the radial direction, such a concentric alignment of the clutch cover in relation to the pressing screw arranged concentrically in the base plate of the pretensioning means is not possible with sufficient accuracy. This in turn has the drawback that the clutch cover must be adjusted in the state in which it is attached to the driven plate, because when the clutch cover is mounted eccentrically in relation to the pressing screw, the clutch cover is also arranged eccentrically in relation to the centering tool and consequently also eccentrically in relation to the carrier plate when the centering tool is arranged in the through hole of the pressing screw. However, the clutch cover is also arranged eccentrically in relation to the driven plate in the state in which it is attached to the driven plate via the centering tool, so that an adjustment is indispensable, but this is possible only conditionally if at all because of the strong clamping forces of the pretensioning means.

SUMMARY OF THE INVENTION

Thus, the basic object of the present invention is to improve a device of this type such that a concentric mounting of the clutch cover together with the carrier plate can be carried out with certainty.

This object is accomplished according to the present invention by providing centering bolts, which can be replaced with individual mounting bolts of the clutch cover and which can be screwed stationarily into the mounting threads of the driven plate through the mounting holes of the clutch cover, and that the centering bolts engage adjusting slots of the base plate which extend radially in relation to the pressing screw, and that the base plate can be fixed in the axial direction on the centering bolts by means of tightening nuts.

Due to the embodiment according to the present invention, the clutch cover can be aligned concentrically with the base plate of the pretensioning means and at the same time concentrically with the driven plate. As was already explained above, the clutch cover is attached to the driven plate by means of corresponding mounting bolts. As a rule, a total of six or more mounting bolts are provided for this purpose, which are arranged on the driven plate in a uniformly distributed pattern on the circumference. The clutch cover correspondingly has six or more through holes, through which the mounting bolts are passed and are screwed into the driven plate in the mounted state.

To remove the clutch, three of the mounting bolts can be removed without warping of the clutch cover taking place, and they can be replaced with three centering bolts. If the clutch cover is mounted, for example, with eight mounting bolts on the driven plate, four of the mounting bolts can be removed. The remaining mounting bolts remain in the driven plate for fixing the clutch cover, so that the clutch cover is still held sufficiently on the driven plate. The base plate is now attached to the centering bolts screwed stationarily into the driven plate through the through holes.

If three of the mounting bolts are to be removed, the base plate correspondingly has three radially extending adjusting slots, which are arranged in the base plate offset by 120° each in relation to one another corresponding to the arrangement of the centering bolts in the driven plate. If four centering bolts are used, four adjusting slots are correspondingly to be provided in the base plate in corresponding angular arrangements in relation to one another. Due to the approximately clearance-free engagement of the centering bolts in the adjusting slots, concentric alignment of the base plate with its pressing screw in relation to the driven plate and consequently also in relation to the bearing bore arranged in the crankshaft concentrically in relation to the driven plate is achieved. The base plate is now displaced on the centering bolts axially against the clutch cover until the pressing screw comes into contact with the inner lever sections of the plate spring. A tightening nut is subsequently screwed on the tie bolts and the axial position of the base plate in relation to the clutch cover is fixed.

Since the carrier plate is already arranged concentrically with the driven plate before the removal of the coupling, the centering tool can now also be inserted into the bearing bore of the crankshaft through the pressing screw and the carrier plate. This measure is used during the removal of the clutch only to secure both the carrier plate and the clutch cover, so that they cannot fall off after the removal of the remaining mounting bolts and after removal of the three centering bolts, but are held by the centering tool. By subsequently tightening the pressing screw, the plate spring is now pretensioned and the clutch is thus released. The remaining mounting bolts of the clutch cover that have still remained in the driven plate can now be removed. The three centering bolts are then removed as well, so that the clutch cover can be pulled off. The carrier disk is subsequently also removed together with the centering tool. It is obvious that the centering tool is not absolutely necessary for the removal of the clutch, but, as was mentioned above, it can be used to secure the parts of the clutch against falling off.

To assemble the clutch, the centering tool is first connected stationarily with the carrier plate via its centering cone, as it is known from the state of the art, and is placed into the bearing bore of the crankshaft with a centering pin projecting on the front side, concentrically with and on the driven plate. The clutch cover is subsequently placed with the pressure plate and the plate spring on the carrier plate and aligned by means of its through holes with the mounting bolts of the driven plate. The three centering bolts are then screwed stationarily into the mounting threads arranged correspondingly offset by 120° in relation to one another on the circumference of the driven plate. Since the mounting threads have the same depth and all the centering bolts have the same length, the centering bolts also project over the same length from the driven plate in the state in which they are screwed completely into the mounting threads.

After the base plate with its adjusting slots has been placed on the centering bolts, the tightening nuts are screwed onto the centering bolts and brought into the same axial distance, i.e., into the same axial distance from the driven plate. Thus, the base plate is supported at the tightening nuts in such a way that it extends in parallel to and concentrically with the driven plate during the subsequent pretensioning operation. The centering tool, which is inserted into the driven plate and into the bearing bore and over which the base plate can be pushed axially with its pressing screw, is used to attach the base plate.

To pretension the plate spring for a warpage-free assembly of the clutch cover, the pressing screw is now tightened until the plate spring is completely pretensioned. The clutch cover with its pressure plate can now be placed flat on the driven plate, so that the three mounting bolts can be screwed at first into the free mounting threads of the driven plate to fix the clutch cover and can be firmly tightened. After the pressing screw has been completely released, the tightening nuts can now be removed again from the centering bolts. The base plate is then removed together with the pressing screw from the centering bolts and from the centering tool still located in the carrier plate and the bearing bore of the crankshaft. After removal of the centering bolts, the remaining mounting bolts are mounted. After the removal of the centering tool, the clutch is completely mounted, and all components are inevitably arranged concentrically with one another, so that the gear with its gear shaft can be inserted into the teeth of the carrier plate and into the bearing bore of the crankshaft without problems.

Thus, provisions may be made for the tightening nuts to be provided with a through thread each, which is closed on one side and through which the tightening nuts can be screwed onto the centering bolts in a defined axial position. It is ensured by this embodiment that the base plate with its adjusting slots can be aligned such that it extends in parallel to the driven plate.

The tightening nuts may be provided with a cylindrical centering attachment each, with which the tightening nuts engage lateral guide shoulders of the adjusting slots in a nearly clearance-free manner. The concentric alignment of the pressure plate with the driven plate is simplified by this embodiment. Furthermore, a clearance-free engagement of the centering bolts with the adjusting slots is not absolutely necessary, but a greater clearance may be provided, so that the base plate can be placed on the centering bolts more easily.

The device according to the present invention can be used for different types of clutches. To mount different clutches of different manufacturers, provisions are made for this purpose for providing a plurality of sets of centering bolts, which are provided with different screw-in threads for mounting on driven plates with different mounting threads.

An extremely lightweight design may be obtained, as a result of which the handling of the device according to the present invention is considerably facilitated. Provisions are made for this for the base plate to have a plurality of uniformly distributed arrangement of draw arms, in which the adjusting slots are arranged. The arrangement of these draw arms with their adjusting slots is adapted to the arrangement of the centering bolts screwed into the driven plate. If, for example, three centering bolts arranged uniformly on the circumference of the driven plate are provided, the draw arms are aligned in a star-shaped pattern and extend at 120° in relation to one another. However, if, for example, four centering bolts arranged uniformly on the circumference of the driven plate are provided, the draw arms are aligned in a star-shaped pattern and extend at 90° in relation to one another.

To keep the actuating forces during the pretensioning of the plate spring as low as possible, provisions may be made according to claim 6 for the pressing screw for pretensioning the plate spring to have a thrust collar on the pressure side, which is mounted rotatably on the pressing screw by means of a rolling bearing.

Provisions may be made for the centering tool to be formed from a central guide tube, which has a central through hole, which is open on both sides and which has, in the area of one of its ends, a radially expanded receiving section, in which a centering cone is replaceably arranged. Due to this embodiment of the centering tool with its replaceable centering cone, the centering tool can be used variably for clutches of different sizes.

The centering tool can be caused to stationarily engage the teeth of a carrier plate of a clutch in a simple and reliable manner. Provisions are made for this for providing in the guide tube a tie rod, which passes through the guide tube together with the centering cone and which has an expanding cone, which can be pushed into the centering cone, for widening the centering cone, and for the tie rod to have a threaded section in its end area located opposite the expanding cone, where a tensioning nut, by means of which the tie rod can be axially adjusted in the guide tube, is screwed onto the threaded section.

The centering tool can be caused to engage the base plate, concentrically therewith, together with the carrier plate in advance for assembling the clutch, so that the carrier plate is inevitably aligned concentrically with the driven plate after the base plate has been attached to the centering bolts. This embodiment is especially advantageous if the crankshaft has no bearing bore for the drive shaft of the gear. No centering pin, which would engage such a bearing bore for concentrically aligning the carrier plate, can be used on the centering tool in this case.

If a bearing bore is present in the crankshaft, the centering tool can be used as a centering or aligning aid for the pretensioning means. The centering tool is provided for this purpose with a centering pin, which is fittingly inserted into the bearing bore of the crankshaft concentrically with the driven plate before the pretensioning means is attached. The carrier plate, which engages the centering tool, is thus also aligned concentrically with the driven plate. When the pretensioning means with its pressing screw is pushed over the centering tool, this pressing screw is also aligned concentrically with the driven plate, so that the base plate with its adjusting slots can be caused to engage the centering bolts screwed into the driven plate in a simple manner. Provisions are made for this for the completely mounted centering tool with its guide tube, the tie rod and the tensioning nut to be able to be pushed through the central through hole of the pressing screw.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
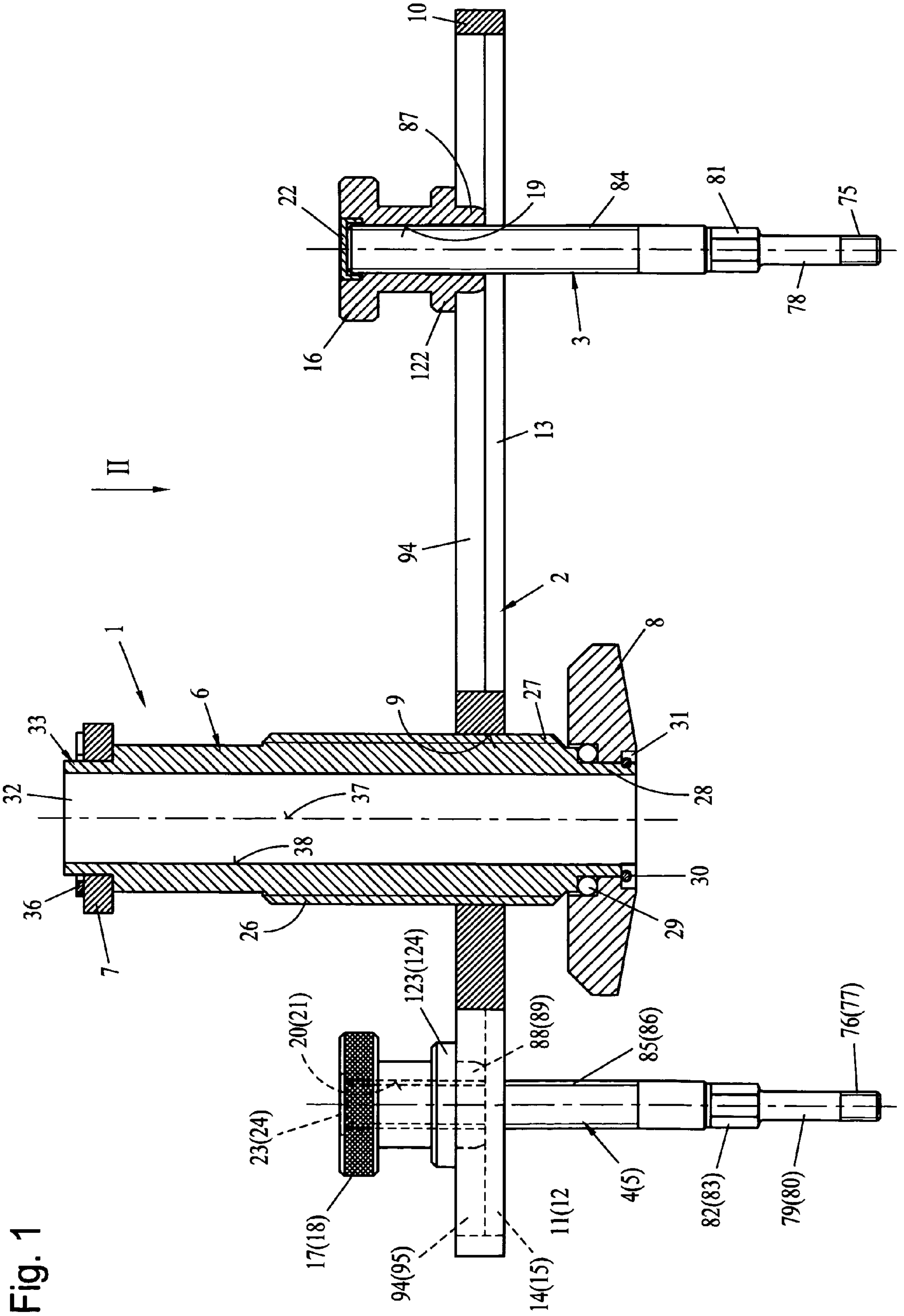
FIG. 1 is a vertical sectional view of a pretensioning means of the type according to the present invention.
Figure 2:
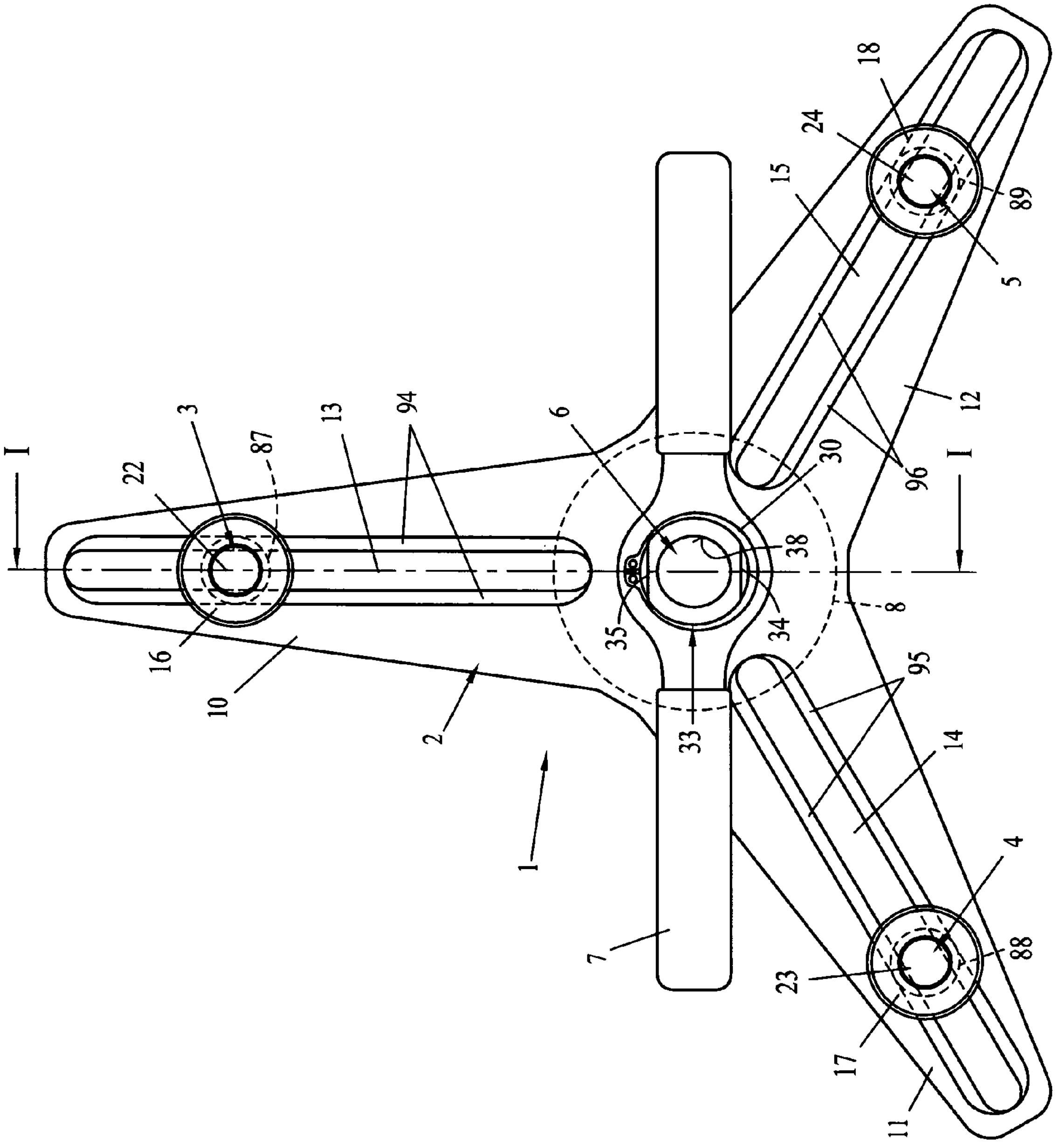
FIG. 2 is a top view II of the pretensioning means from FIG. 1.

Referring to the drawings in particular, FIGS. 1 and 2 show as an example an embodiment of a pretensioning means 1 according to the present invention, which comprises in this exemplary embodiment a base plate 2, three centering bolts 3, 4 and 5 as well as a pressing screw 6 with an actuating lever 7 and a thrust collar 8.

As is apparent especially from FIG. 2, the pressure plate 2 has an approximately star-shaped base and is provided with a central through thread 9. The base plate 2 forms three draw arms 10, 11 and 12, which are arranged in a star-shaped pattern and have a radially extending adjusting slot 13, 14 and 15. These adjusting slots 13, 14 and 15 are arranged, together with their draw arms 10, 11 and 12, offset at an angle of 120° in relation to one another.

The adjusting slots 13, 14 and 15 are used for the radially displaceable mounting of the respective associated centering bolt 3, 4 and 5. The centering bolts 3, 4 and 5 are of an identical design and have a respective tightening nut 16, 17, 18 to fix the axial position of the base plate 2. To accurately fix the axial positions of the tightening nuts 16, 17 and 18 at the respective associated centering bolt 3, 4 and 5, the tightening nuts 16, 17, 18 are provided with a respective through thread 19, 20, 21, which are closed “on the top side” by a closing cover 22, 23, 24 inserted into the tightening nuts 16, 17, 18.

Due to the length of the adjusting slots 13, 14 and 15, the base plate 2 can be pushed over centering bolts 3, 4, 5, which are arranged on different radii, depending on the size of the clutch to be mounted.

As is apparent from FIG. 1, the pressing screw 6 is provided with an external thread 26, which extends approximately over the lower two thirds of its overall length and with which the pressing screw 6 engages the base plate 2 in an axially adjustable manner. In its lower end area 27, the pressing screw 6 has a radially tapered, cylindrical bearing seat 28, on which the thrust collar 8 is rotatably mounted. A rolling bearing 29 is provided on the base plate side between the thrust collar 8 and the bearing seat 28 for the rotatable mounting of this thrust collar 8 on the bearing seat 28. To captively secure the thrust collar 8 on the lower end 27 or the bearing seat 28 of the pressing screw 6, a circlip 30 is provided, which is arranged recessed in a circumferential recess 31 of the thrust collar 8 in the mounted state.

The actuating lever 7 is attached at the top end 32 of the pressing screw 6 on a correspondingly tapered, offset receiving section 33. This receiving section 33 has two wrench surfaces 34 and 35, which extend in parallel to one another and on which an actuating lever 7, formed from a flat steel in this exemplary embodiment, is placed with a fittingly profiled opening. To secure the actuating lever 7 on the receiving section 33, a circlip 36 is provided.

When the actuating lever 7 is actuated and the pressing screw 6 is hence rotating about its central longitudinal axis 37, this [pressing screw] performs an axial relative movement in relation to the base plate 2, so that the pretensioning means 1 can be used, for example, to pretension a plate spring of a motor vehicle clutch.

As is also apparent from FIGS. 1 and 2, the pressing screw 6 has a central through hole 38, which is open on both sides and is not closed by either the actuating lever 7 arranged at the top or the thrust collar 8 of the pressing screw 6 arranged at the bottom. This central through hole 38 is used to receive a centering tool 40, which can be seen as an example in FIG. 3.

Furthermore, it can be recognized from FIGS. 1 and 2 and especially from FIG. 1 that the centering bolts 3, 4, 5 are of an identical design. At their lower ends, the centering bolts 3, 4, 5 are provided with a screw-in thread 75, 76, 77, with which the centering bolts 3, 4, 5 can be screwed into a corresponding mounting thread of a driven plate. Guide shafts 78, 79, 80, whose diameter corresponds to that of the screw-in threads 75, 76, 77 and along which a clutch cover with its through hole is displaced in an axially limited manner, are provided above the screw-in threads 75, 76, 77. These guide shafts 78, 79, 80 are joined by a hexagon 81, 82, 83, via which the centering bolts 3, 4, 5 can be stationarily screwed into the respective mounting hole of the driven plate with a corresponding wrench tool in a firmly seated manner.

The centering bolts 3, 4, 5 have corresponding mounting threads 84, 85, 86 in the upward direction, on which the tightening nuts 16, 17, 18 can be screwed. Since the mounting threads of a driven plate are always designed as blind threads, the maximum depth over which the centering bolts are screwed in is set unambiguously. The centering bolts 3, 4, 5 thus always project in the mounted state over the driven plate with an at least approximately equal length. It is thus ensured that the tightening nuts 16, 17, 18, which are screwed onto the centering bolts 3, 4, 5 and are in contact by their closing covers 22, 23, 24 with the respective centering bolt 3, 4, 5, always have the same distance from the driven plate, so that the base plate 2 which is in contact with the tightening nuts 16, 17, 18 is aligned in parallel to the driven plate.

Furthermore, FIGS. 1 and 2 show that the tightening nuts 16, 17 and 18 are provided with an additional centering attachment 87, 88 and 89 each, with which these engage a guide shoulder 94, 95, 96 of the respective associated adjusting slot 14, 15, 16, which said guide shoulders are enlarged axially and in their width. Due to these additional centering attachments 87, 88, 89, the width of the adjusting slots 13, 14, 15 can be made greater compared to the diameter of the centering bolts 3, 4, 5, because the centering proper of the base plate 2 is carried out by means of the centering attachments 87, 88 and 89 of the tightening nuts 16, 17 and 18 and by means of the guide shoulders 94, 95 and 96 of the adjusting slots 13, 14 and 15. The base plate 2 with its adjusting slots 13, 14, 15 can thus be placed on the centering bolts 3, 4, 5 mounted on a driven plate in a considerably simplified manner, because there is sufficient clearance in this case between the adjusting slots 13, 14, 15 and the associated centering bolts 3, 4, 5 for the attachment.

Above the centering attachments 87, 88 and 89, the tightening nuts 16, 17 and 18 have a radially expanded stop collar 122, 123 and 124, respectively, with which the tightening nuts 16, 17, 18 are flatly in contact on the top side with the base plate 2 during the pretensioning of the clutch.

Figure 3:
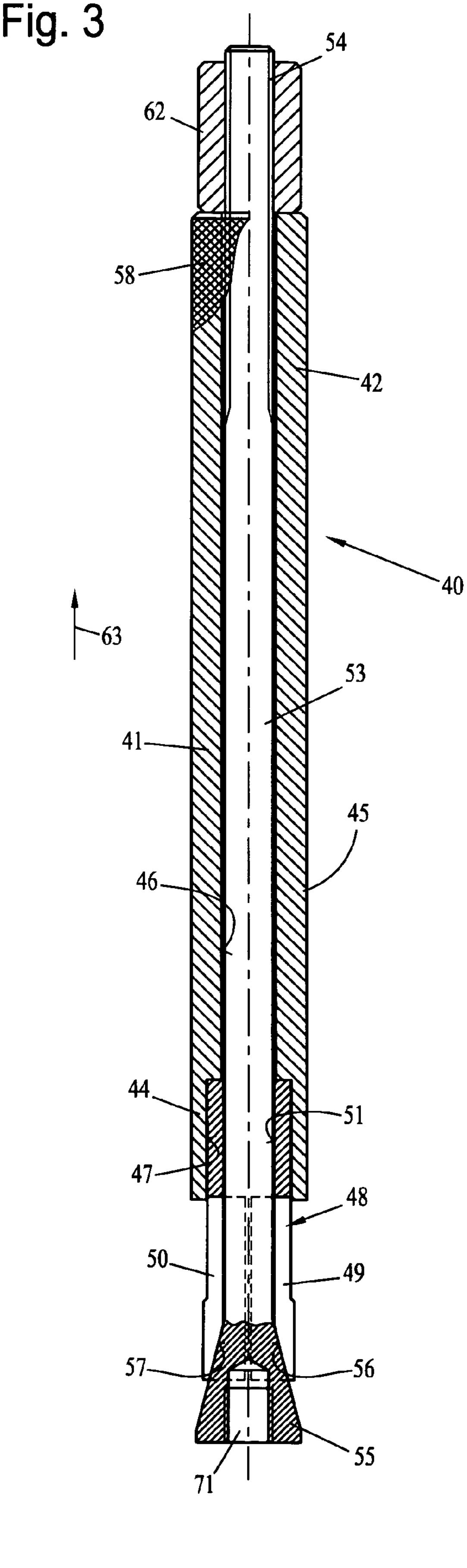
FIG. 3 is a vertical longitudinal sectional view through a centering tool, which can be combined with the pretensioning means from FIGS. 1 and 2.

As is apparent from FIG. 3, the centering tool 40 comprises a central guide tube 41, which has a cylindrical design. The guide tube 41 has a central through hole 46, which is open on both sides and which has a radially expanded receiving section 47 in the area of the lower end 44 of the guide tube 41. A centering cone 48, which is provided with four expanding elements in this exemplary embodiment, of which only the two rear expanding elements 49 and 50 can be recognized in FIG. 3, is inserted into this receiving section 47 clampingly and in a replaceable manner. The centering cone 48 likewise has a through hole 51 which is open on both sides.

As is apparent from FIG. 3, a through tie rod 53, which axially protrudes from the guide tube 41 upwardly with a threaded section 54, is arranged in the through hole 46 of the central guide tube 41 and in the through hole 51 of the centering cone 48, which said through hole 51 is flush with through hole 46. At the lower end, the tie rod 53 is provided with an expanding cone 55, which is in contact with corresponding inner cone surfaces 56 and 57 of the expanding elements 49 and 50, respectively, in the embodiment shown in FIG. 3. In its upper end area, the guide tube 42 has a knurled profile, by means of which the guide tube 42 can be manually fixed.

A tensioning nut 62, which is used for the axial adjustment of the tie rod 53 with its expanding cone 55 for expanding the expanding elements 49 and 50 of the centering cone 48, is provided on the threaded section 54 above the knurled profile 58 in the shown mounted state of the centering tool 40. The centering cone 48 is used now to clampingly mount a carrier plate and is inserted for this purpose into the clutch teeth of the carrier plate.

By actuating the tightening nut 62, the tie rod 53 is displaced upwardly in the direction of the arrow 63, so that by pulling the expanding cone 55 into the expanding elements 49 and 50, these expanding elements 49, 50 are pressed radially outwardly, so that the carrier plate with its clutch teeth is held clampingly on the centering cone 48.

Figure 4:
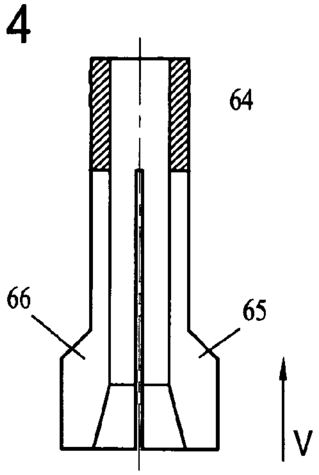
FIG. 4 is a vertical longitudinal sectional view through a second centering cone.
Figure 5:
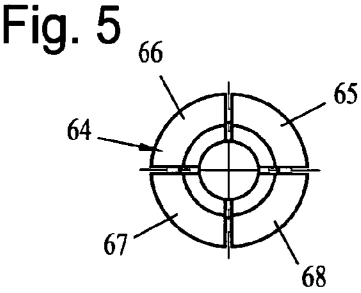
FIG. 5 is a bottom view V of the centering cone from FIG. 4.

The centering cone 48 is held in the receiving section 47 only clampingly and can be replaced by another centering cone 64, as this is shown as an example in FIGS. 4 and 5. This centering cone 64 differs from the centering cone 48 in that its expanding elements 65, 66, 67 and 68 have a larger external diameter in their lower end areas in the unloaded state, i.e., in the state in which they are not expanded. Thus, the centering cone 64 is intended for carrier plates which have a considerably larger clutch tooth diameter than the maximum possible diameter of the centering cone 48. FIG. 5 shows the division of the expanding elements 65, 66, 67, 68 into four parts. This division into four parts is also provided in the expanding elements 49 and 50 and the other two expanding elements of the centering cone 48, which are not recognizable in FIG. 3.

Figure 6:
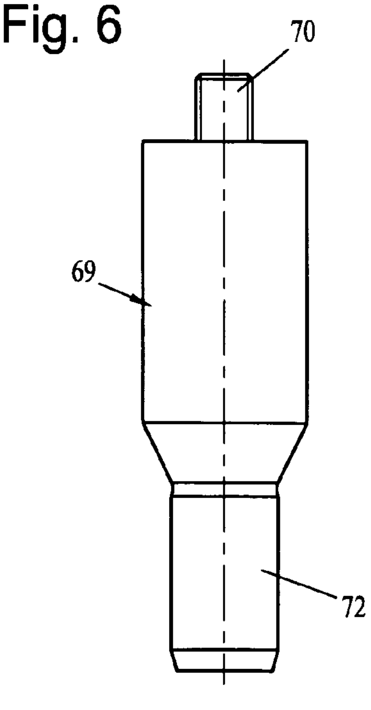
FIG. 6 is an additional centering pin for the centering tool from FIG. 3.

FIG. 6 shows an additional centering pin 69, which is provided with a threaded pin 70 at its top end. This centering pin 69 can be screwed with its threaded pin 70 into a corresponding threaded hole 71 on the front side into the expanding cone 55 of the tie rod 53. This centering pin 69 is used when a bearing bore for a gear shaft is provided in the crankshaft in a motor vehicle engine. The centering pin 69 has, for this purpose, at its lower end, a centering pin 72, which can be fittingly inserted into this bearing bore of the crankshaft, so that the centering tool 40 can also be used through this measure to center a carrier plate in relation to the driven plate of a motor vehicle engine without a pretensioning means 1 as well.

Figure 7:
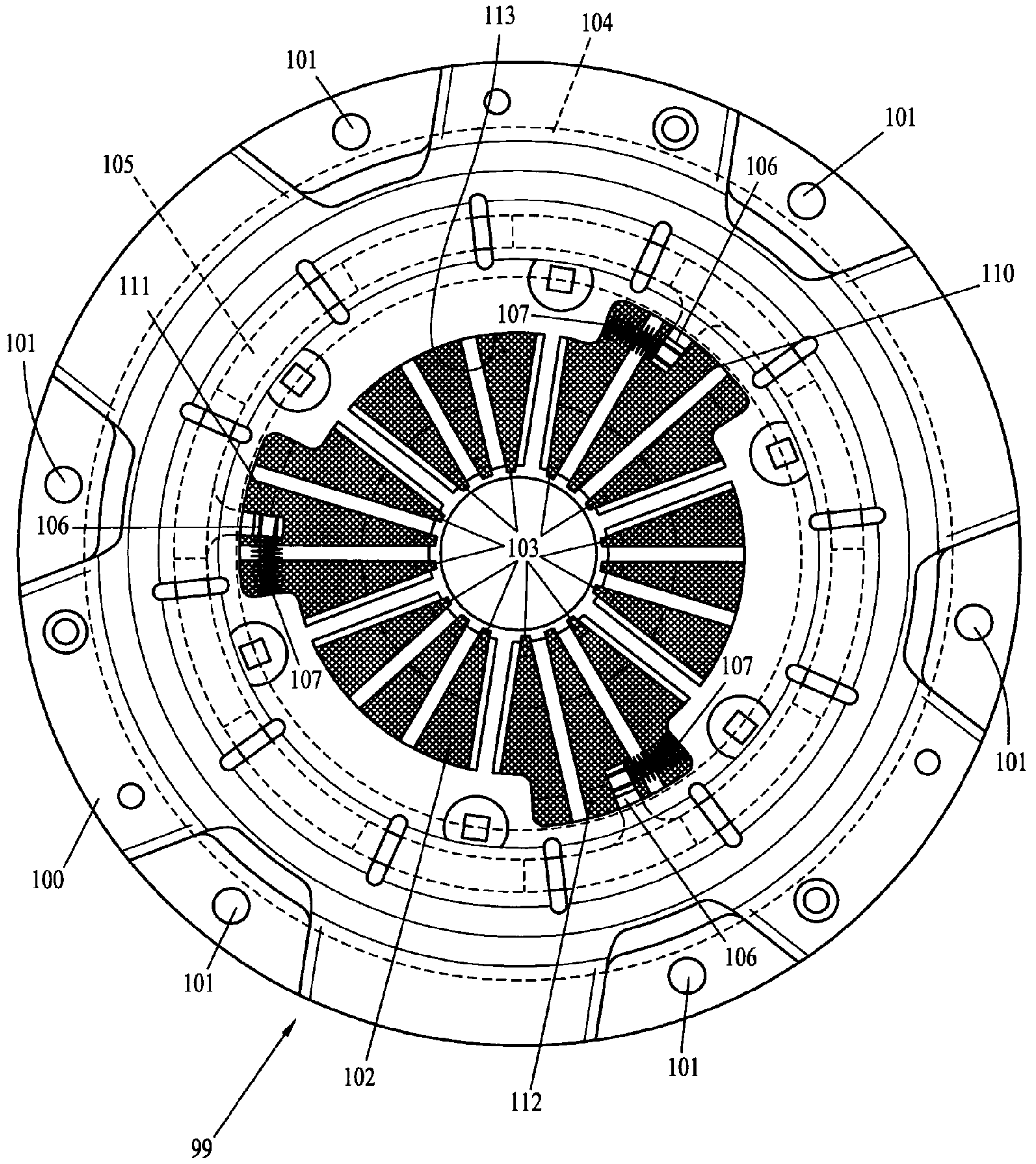
FIG. 7 is a top view of a clutch with a clutch cover, a pressure plate, a plate spring as well as an adjusting ring, which can be rotatably adjusted in relation to the clutch cover.

To explain the mode of operation of the device according to the present invention in greater detail, FIG. 7 shows a top view of a clutch 99 with a clutch cover 100 of a motor vehicle clutch. This clutch cover 100 is provided in its circumferential area with a plurality of fastening holes 101, via which the clutch cover 100 can be screwed onto a driven plate of a motor vehicle engine. A plate spring 102, which has radially inwardly aligned lever sections 103 for actuating the clutch, is provided within the clutch cover 100. A pressure plate 104, which is indicated by broken lines in FIG. 7 and which can be moved in the axial direction in relation to the clutch cover 100, is pressed by this plate spring 102 against the carrier plate, which was already mentioned above, so that the clutch 99 is closed because of the spring force of the plate spring 102. When the plate spring 102 is actuated by depressing the lever sections 103, the clutch is released, i.e., the pressure plate 104 is withdrawn.

Figure 8:
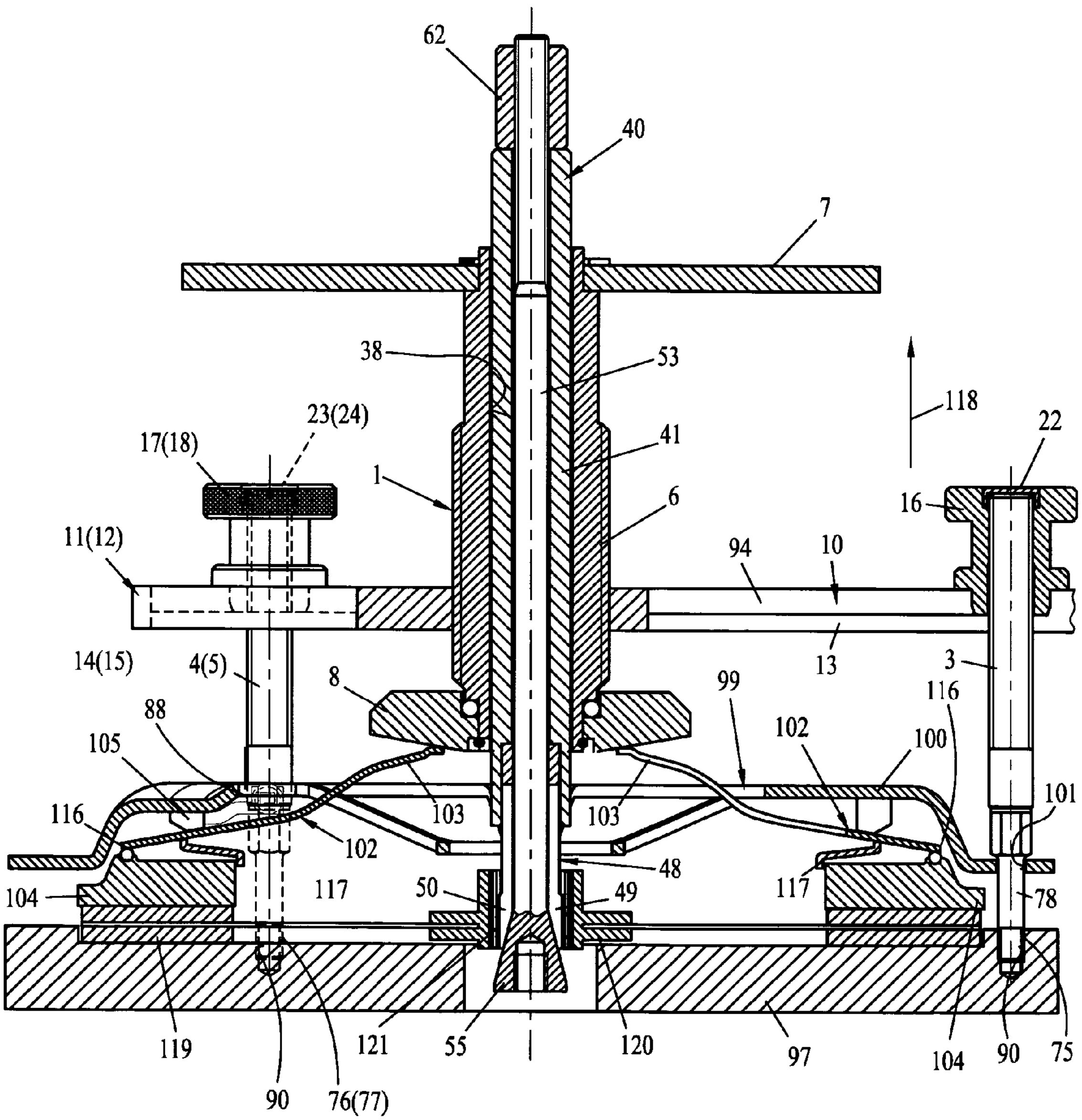
FIG. 8 is a longitudinal sectional view through a motor vehicle clutch with a pretensioning means attached and a pre-assembled centering tool.

As it is shown in FIG. 8, the pretensioning means 1 is used for this purpose. It can be recognized from the simplified sectional view in FIG. 8 that the pretensioning means 1 is screwed with its centering bolts 3, 4 and 5 into corresponding mounting threads 90 of the driven plate 97 of the clutch 99. Thus, FIG. 8 shows, likewise as examples, only the centering bolts 3 and 4 of the pretensioning means 1 with their lower screw-in threads 75, 76, which are screwed stationarily into the respective associated mounting thread 90 of the driven plate 97. Because of the above-described axial fixation of the base plate 2 by means of the tightening nuts 16, 17, 18, the base plate 2 extends in parallel to the driven plate 97, so that the pressing screw 6 is aligned concentrically with the driven plate 97 and consequently also with the plate spring 102.

In this mounted position, the thrust collar 8 of the pressing screw 6 of the pretensioning means 1 lies on the inner ends of the lever sections 103 of the plate spring 102. It easy to imagine that by actuating the actuating lever 7 and consequently by screwing the pressing screw 6 into the base plate 2 of the pretensioning means 1, the plate spring 102 is pretensioned by depressing its lever sections 103 against the arrow 118.

Since the plate spring 102 is mounted circumferentially at a radially spaced location from its circumferential outer edge 116 by a sensor plate spring 117, the circumferential outer edge 116 of the plate spring 102 moves upwardly in the direction of the arrow 118 during this pretension of the plate spring 102 due to the actuation of the pretensioning means 1, while the areas of the plate spring 102 that are located within the sensor spring 117 move downward against the arrow 118.

It can be recognized in FIG. 8 that the centering tool 40 engages the carrier plate 119 of the clutch 99 in a positive-locking manner and the carrier plate is thus aligned by the centering tool 40 in a centered manner in relation to the driven plate 97.

As is shown in FIG. 8, the centering tool 40 is pushed through the through hole 38 of the pretensioning means 1 and the pressing screw 6 until it protrudes with its centering cone 48 into the clutch teeth 121 of the hub 120 of the carrier plate 119. Due to the subsequent actuation of the tensioning nut 62, the tie rod 53 with its expanding cone 55 moves in the direction of the arrow 118 relative to the central guide tube 41 of the centering tool 40, so that the expanding elements 49 and 50 are expanded outwardly and come clampingly into contact with the clutch teeth 121. The carrier plate 119 is thus held clampingly at the centering cone 48. The knurled profile 58 is used to hold up the guide tube 41 during the actuation of the tensioning nut 62.

Furthermore, it can be recognized from FIG. 8 that the tie rod 53 is guided axially displaceably in the through hole 38 of the pressing screw 6. Due to this guiding, the tie rod 53, on the one hand, and, on the other hand, also the carrier plate 119 stationarily engaging the centering cone 48 of the tie rod are aligned concentrically with the pretensioning means 1. In the state of the pretensioning means 1 which is shown in FIG. 8 and in which it is aligned concentrically with the driven plate 97 by means of the centering bolts 3, 4 and 5, the carrier plate is consequently inevitably aligned concentrically with the driven plate 97 and also with the rest of the clutch 99. Thus, this embodiment also makes it possible to align the carrier plate 119 concentrically with the driven plate 97 by means of the pretensioning means 1 in case the crankshaft (not explicitly shown in the drawing) is not provided with a central bearing bore for mounting a gear shaft, which the centering tool 40 can be caused to engage, for example, by means of the centering pin from FIG. 6.

Simple and reliable assembly and also removal of a motor vehicle clutch can be carried out with the device according to the present invention.

While specific embodiments of the invention have been shown and described in detail to illustrate the application of the principles of the invention, it will be understood that the invention may be embodied otherwise without departing from such principles.

What is claimed is:

1. A device for the assembly of a motor vehicle clutch, the device comprising:

a pretensioning means for tensioning a plate spring arranged in a clutch cover of the motor vehicle clutch together with a pressure plate and by which the pressure plate is pressed against a carrier plate of the clutch during operation, wherein the clutch cover is mounted stationarily during operation on a driven plate of the clutch by means of a plurality of individual mounting bolts engaged in mounted threads of the driven plate and mounting holes of the clutch cover and wherein the pretensioning means has a base plate with a central pressing screw, which is axially adjustable against the plate spring centrally through the base plate for pretensioning the plate spring, said central pressing screw being provided with a central through hole;

a centering tool which can be arranged in said central through hole for the centered preassembly of the carrier plate;

centering bolts for replacement with the individual mounting bolts of the clutch cover, said centering bolts being screwed stationarily into the mounted threads of the driven plate through the mounting holes of the clutch cover while allowing the clutch cover to be guided axially movably such that the clutch cover is not screwed stationarily against the driven plate by the centering bolts, each one of said centering bolts being received in one of at least three circumferentially distributed adjusting slots defined by said base plate of said pretensioning means with a small clearance, said adjusting slots extending radially in relation to said pressing screw; and tightening nuts, said base plate being fixed on said centering bolts in an axial direction by means of said tightening nuts.

2. A device in accordance with claim 1, wherein said tightening nuts are each provided with a through thread, which are closed on one side and by means of which said tightening nuts can be screwed onto the centering bolts in a defined axial position.

3. A device in accordance with claim 1, wherein the tightening nuts are provided with a cylindrical centering attachment, with which the tightening nuts engage lateral guide shoulders of said adjusting slots in a nearly clearance-free manner.

4. A device in accordance with claim 1, wherein for mounting different clutches of different manufacturers, a plurality of sets of said centering bolts are provided, which are provided with different screw-in threads for mounting on said driven plates with said different mounting threads.

5. A device in accordance with claim 1, wherein said base plate has a plurality of draw arms, in which the adjusting slots are arranged.

6. A device in accordance with claim 1, wherein for pretensioning the plate spring, said pressing screw has, on a pressure side, a thrust collar, which is mounted rotatably at said pressing screw by means of a rolling bearing.

7. A device in accordance with claim 1, wherein said centering tool is formed from a central guide tube, which has a central through hole, which is open on both side and which has, in the area of one of ends, a radially expanded receiving section, in which a centering cone is arranged in a displaceable manner.

8. A device in accordance with claim 7, further comprising a tie rod, which passes through said guide tube together with the centering cone and which has a expanding cone, which can be pushed into the centering cone for widening the centering cone, is provided in the guide tube, and said tie rod has, in an end area located opposite the expanding cone, a threaded section, on which a tensioning nut is screwed, by means of which the tie rod is axially adjustable in said guide tube.

9. A device in accordance with claim 8, wherein the completely assembled centering tool with said guide tube, with said tie rod and with said tensioning nut can be pushed through the central through hole of the pressing screw.

* * * * *